(12) United States Patent
Ericsson

(10) Patent No.: US 7,866,175 B2
(45) Date of Patent: Jan. 11, 2011

(54) FLOW CONTROL OF REFRIGERANT

(76) Inventor: Svenning Ericsson, Lonnrunan 54, Torslanda (SE) S-423 46

( * ) Notice: Subject to any disclaimer, the term of this patent is extended or adjusted under 35 U.S.C. 154(b) by 448 days.

(21) Appl. No.: 12/159,112

(22) PCT Filed: Jan. 30, 2007

(86) PCT No.: PCT/SE2007/050045
§ 371 (c)(1),
(2), (4) Date: Jun. 25, 2008

(87) PCT Pub. No.: WO2007/089200
PCT Pub. Date: Aug. 9, 2007

(65) Prior Publication Data
US 2009/0113905 A1 May 7, 2009

(30) Foreign Application Priority Data
Feb. 1, 2006 (SE) .................................... 0600222

(51) Int. Cl.
*F25B 49/00* (2006.01)
(52) U.S. Cl. ............................ 62/222; 62/127; 62/129; 62/197
(58) Field of Classification Search .................. 62/125, 62/126, 127, 129, 197, 218, 222
See application file for complete search history.

(56) References Cited
U.S. PATENT DOCUMENTS

| | | | | |
|---|---|---|---|---|
| 4,136,528 A * | 1/1979 | Vogel et al. | ..................... | 62/174 |
| 4,138,879 A * | 2/1979 | Liebermann | ................ | 73/19.03 |
| 4,328,682 A | 5/1982 | Vana | | |
| 5,072,595 A * | 12/1991 | Barbier | ......................... | 62/129 |
| 5,230,223 A * | 7/1993 | Hullar et al. | ................ | 62/196.4 |
| 5,341,649 A * | 8/1994 | Nevitt et al. | ................... | 62/126 |
| 7,681,407 B2 * | 3/2010 | Thybo et al. | ................... | 62/129 |
| 7,690,212 B2 * | 4/2010 | Narayanamurthy et al. | ... | 62/222 |
| 2009/0272145 A1* | 11/2009 | Ericsson | ....................... | 62/503 |
| 2009/0288433 A1* | 11/2009 | Justak | ......................... | 62/129 |

* cited by examiner

*Primary Examiner*—Marc E Norman
(74) *Attorney, Agent, or Firm*—David A. Guerra

(57) ABSTRACT

The present invention concerns a cooling or heating apparatus including at least a 5 compressor (1), a condenser (2), an expansion apparatus (7), a vaporizer (9) and a space for liquid accumulation (10). The invention is characterized essentially by a control system consisting of an electronic bubble detecting device (4) for detecting the occurrence of bubbles in the refrigerant condensate. The bubble detecting device (4) is attached in proximity to the condenser's (2) outlet or to its exit line, the bubble detecting device (4) is in electrical connection with an expansion apparatus (7) that is controlled electrically. The bubble detecting device (4) gives signals to the expansion apparatus (7). Gas bubbles in the condenser liquid affect the control system so that when the amount of gas bubbles registered/signal analyzed by the bubble detecting device (4) exceeds the set signal value for the presence of bubbles in the condensate there is a signal to the expansion apparatus' electric control unit (7) to shut off or alternatively to decrease the refrigerant flowthrough. When the gas bubble amount is absent or alternatively is less than the predetermined set signal value the expansion apparatus (7) is given a signal from the bubble detecting device (4) to the expansion apparatus' electric control unit (7) to increase the refrigerant flowthrough.

20 Claims, 2 Drawing Sheets

FLOW CONTROL OF REFRIGERANT

CROSS-REFERENCE TO RELATED APPLICATIONS

This application is an U.S. national phase application under 35 U.S.C. §371 based upon co-pending International Application No. PCT/SE2007/050045 filed on Jan. 30, 2007. Additionally, this U.S. national phase application claims the benefit of priority of co-pending International Application No. PCT/SE2007/050045 filed on Jan. 30, 2007 and Sweden Application No. 0600222-4 filed on Feb. 1, 2006. The entire disclosures of the prior applications are incorporated herein by reference. The international application was published on Aug. 9, 2007 under Publication No. WO2007/089200.

TECHNICAL FIELD

The present invention concerns a cooling or heating system including at least a compressor, a condenser, an expansion apparatus and a vaporiser.

The invention also concerns a method for controlling a cooling or heating system.

STATE OF THE ART

On the market there are many different systems for regulating and controlling cooling and heating. Many different solutions are used to optimise heat transfer in vaporisers and condensers. However, the systems that are used are often complicated and of large volume and are thereby needlessly expensive. The systems' size and complexity also implies that the speed of control and their effectiveness become lower than expected. Some previously known systems that have some of the above mentioned disadvantages will be described briefly below.

U.S. Pat. No. 5,333,469 discloses a system that controls pressure control valves in condenser fans via a bubble detecting sensor connected to the electrical control unit, and compressors. The flow regulating expansion valve is a flow control valve.

U.S. Pat. No. 5,341,649 discloses a system that controls condenser fans via a bubble detecting sensor connected to the electrical control unit, and compressors. The flow regulating expansion valve is a standard thermostatic valve.

In the prior art a plurality of systems are known that via a bubble detecting sensor connected to an amplifier unit enables monitoring via test instruments. See e.g. U.S. Pat. Nos. 4,138,879, 5,072,595, 5,974,863 and U.S. Pat. No. 3,974,681.

US 2004/0255613 A1 gives an ejector system whose spray nozzle in the ejector is controlled by a pressure sensor that it is controlled by a sensor placed after the compressor. The flow in the system is controlled via a pressure sensor.

Also US 2004/0211199 A1 gives control of an ejector via pressure control.

US 2004/0040340 A1 gives control of the pilot valve in an ejector via pressure difference control between the condenser pressure and the system's vaporisation side. A problem with the systems in the prior art is that they do not have an optimised amount of refrigerant in the condenser and in the vaporiser, which is of importance for effective energy use.

Thus there is a need of a system that in a simple and flexible way improves the above mentioned systems.

PRESENTATION OF THE INVENTION

A purpose of the present invention is to solve the problem that gas occurring in the condensate causes unnecessary power losses when this gas expands, instead of condensate, on passage through the expansion apparatus, and thereafter absorbs heat.

Another purpose of the invention is to solve the problem of controlling the liquid flow from the condenser or the heat exchanger so that uncondensed gas does not reach the expansion apparatus.

Said purposes are achieved through a cooling and heating system essentially characterized in that an electronic bubble detecting device for detecting the occurrence of refrigerant gas bubbles is attached in, or in proximity to, the condenser's outlet or on the refrigerant condensate liquid pipe located after the condenser, but before the expansion apparatus; and wherein, upon detection of bubbles in the refrigerant condensation liquid, there is a signal to the expansion apparatus from the electronic bubble detecting device to shut off or reduce the refrigerant flowthrough. Thereby a sufficient opening of the expansion apparatus is obtained in such a way that little or no gas bubbles exist when the refrigerant condensate arrives at the expansion apparatus.

The invention also concerns a method of controlling a cooling or heating system comprising the steps of: detecting the occurrence of refrigerant gas bubbles in, or in proximity to, the condenser's outlet or on a refrigerant condensate liquid pipe located after the condenser, but before the expansion apparatus; and upon detection of gas bubbles, sending a signal to the expansion apparatus to shut off or reduce the refrigerant flowthrough so that a sufficient opening of the expansion apparatus is obtained in such a way that little or no gas bubbles exist when the refrigerant condensate arrives at the expansion apparatus.

BRIEF DESCRIPTION OF THE FIGURES

In the following the invention will be described in a non limiting way and by way of illustration with reference to the attached figures in which.

DETAILED DESCRIPTION OF THE INVENTION

Figure 3:
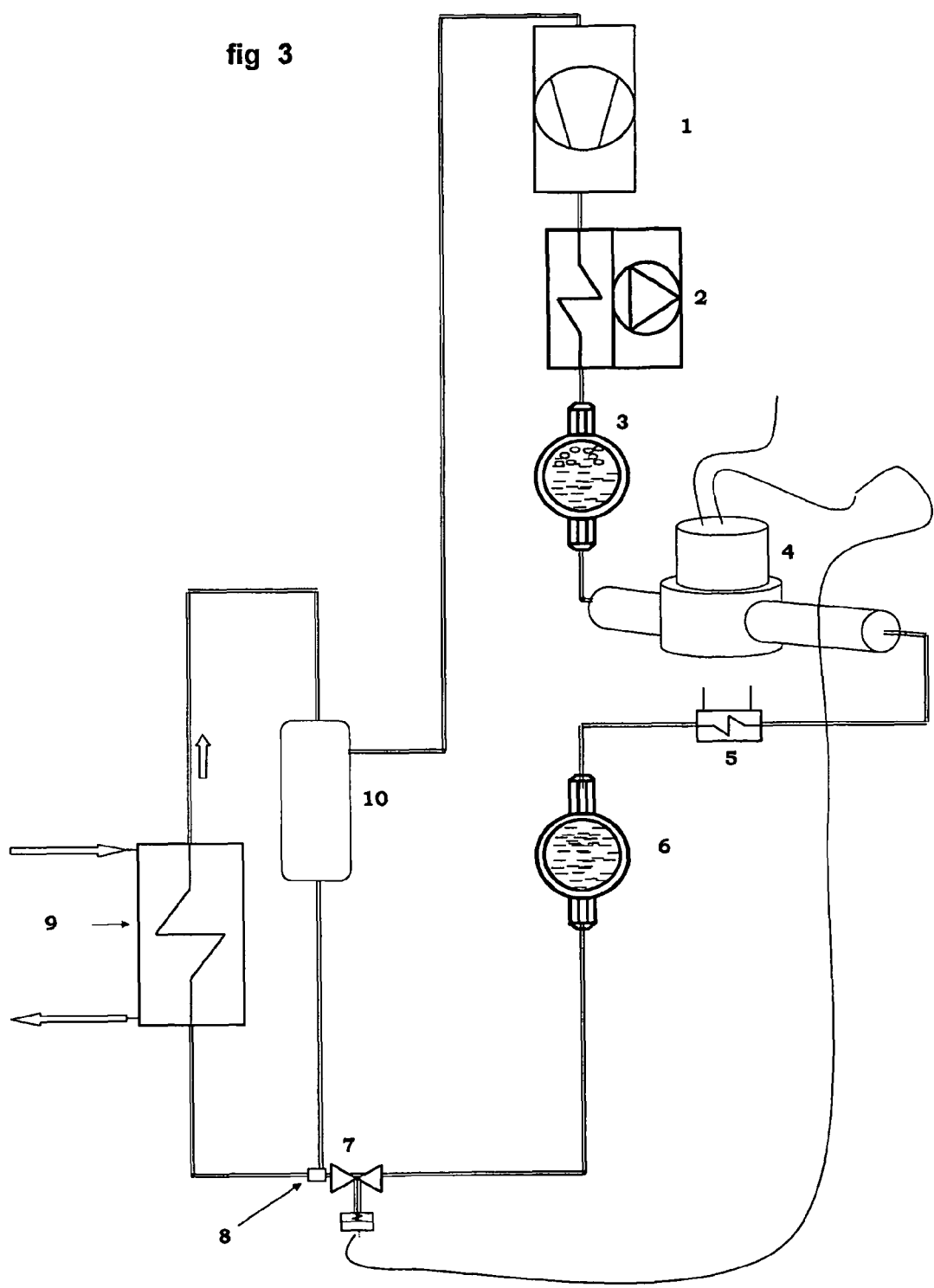
FIG. 3 shows a control system according to the present invention with an electronic bubble detecting device and a signal cable connected to the expansion apparatus with an electrical control unit for refrigerant flow, which have been attached to a cooling/heating system with condensing vaporising refrigerant.

In FIG. 3 is shown a system for heating, cooling, or freezing systems. The system consists of: piping, refrigerant, a compressor 1, a condenser 2, expansion apparatus with electrical control unit 7, a vaporiser 9, space for liquid accumulation 10, an ejector pump device 8, a liquid supercooler/economiser 5, an electronic bubble detecting device 4 intended to give a control signal via one or more cables to the expansion apparatus with electrical control unit 7. By way of illustration in this description the inspection glass 3 and the inspection glass 6 enable visual presentation of the result of the control system's control function, where the inspection glass 3 before the electronic bubble detecting device 4 indicates the presence of bubbles in the refrigerant condensate, and the inspection glass 6 indicates clear liquid without gas bubbles in the refrigerant condensate after the electronic bubble detecting device 4 and the supercooler 5.

The heat exchanger 5 is a supercooler for condensate situated before or after the electronic bubble detecting device 4, this supercooler can recover heat out of the condensate and give an increased cooling factor. The space for liquid accumulation can alternatively consist of collection piping or space in the vaporiser. The heat exchanger 5 can also be replaced by a supercooling circuit in the condenser heat exchanger.

When the expansion apparatus with electrical control unit 7 opens condensed refrigerant flows via the ejector 8 to the system low pressure side where the medium expands. In the ejector pump's 8 suction connection is a pipe for refrigerant liquid connected from the space for liquid accumulation 10.

When refrigerant condensate at high pressure passes through the expansion apparatus with electrical control unit 7 a certain gasification of refrigerant liquid takes place in conjunction with pressure reduction, after which the liquid gas mixture that has passed the ejector nozzle in device 7 at high speed mixes with the fluid from the space for liquid accumulation 10 via the suction connection on the device 8. Thereafter the mixture that now consists of said liquid gas mixture and with liquid from the space for liquid accumulation 10 flows further to the vaporiser 9 where heat uptake to the refrigerant in the cooler, freezer or alternatively the heating system takes place. The heat addition to the refrigerant in the vaporiser 9 usually takes place from air or liquid, whereby the refrigerant liquid absorbs heat and vaporises. The gas/liquid mixture is then forced to the space for liquid accumulation 10 where liquid mainly is separated from gas.

Liquid that has not vaporised is returned from the space for liquid accumulation 10 to the vaporiser via the ejector pump 8.

The gas that mainly has been separated from the fluid in the space for liquid accumulation returns direct or alternatively via supercooler 5 into the compressor 1 that compresses the refrigerant gases that are thereafter cooled in the condenser 2 where condensation of the refrigerants takes place. The bubble detecting device 4 can alternatively be situated after the supercooler 5, but before the expansion apparatus 7.

When not all gas is condensed on passage through the condenser 2 or the heat exchanger 5 the heat release has not been sufficient for complete condensation of all refrigerant to take place, in this case there are gas bubbles left in the refrigerant condensate after the condenser 2 or the heat exchanger 5.

The electronic bubble detecting device 4 detects the occurrence of gas bubbles and gives a signal to the expansion apparatus with electrical control unit 7 to shut off or alternatively reduce flowthrough for too great an amount of gas bubbles, and then device 4 give a signal to the expansion apparatus with electrical control unit 7 to open when clear liquid or a reduced quantity of gas bubbles is detected.

Figure 1:
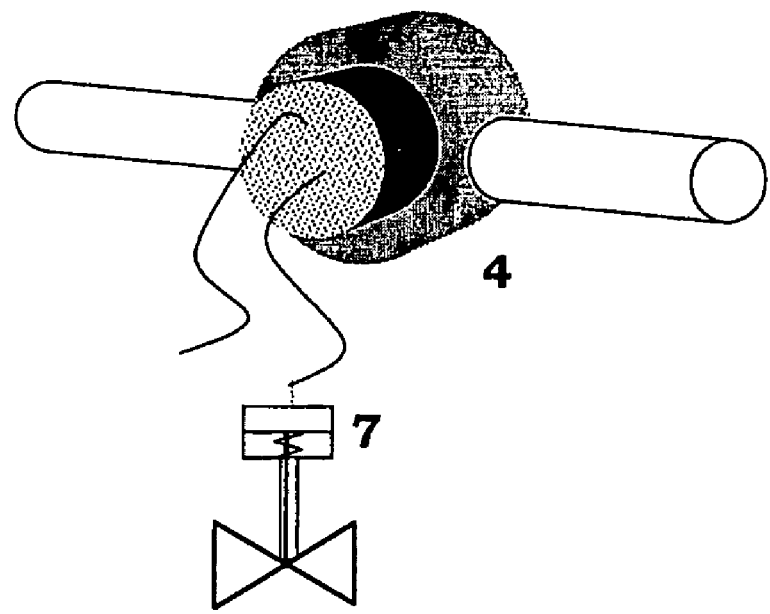
FIG. 1 and FIG. 2 show the control system according to a preferred embodiment according to the present invention in two different positions.
Figure 2:
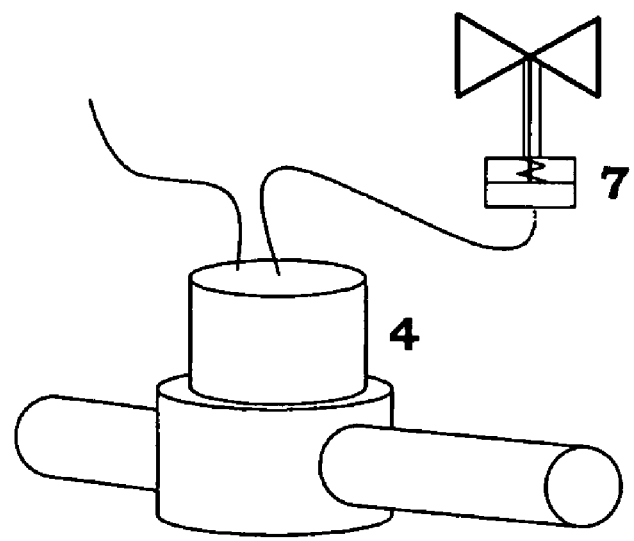

In FIGS. 1 and 2 a device 4 and 7 according to a preferred embodiment is shown.

The detection of gas bubbles can be carried out by using any technique for detecting gas bubbles in a refrigerant, e.g. by using a sensor as described in a document cited above.

The system according to the invention provides effective refrigerant control.

The invention thus implies that gas bubbles in the refrigerant flow from the condenser 2 or the heat-exchanger 5 are detected by the electronic bubble detecting device 4 that analyses the bubble detector signal and produces a transformation to the required control signal for the control system's expansion apparatus with electrical control unit 7 whereby the desired flowthrough is obtained.

The expansion apparatus with an electrical control unit can alternatively be a thermostatic expansion valve where the opening is controlled by an electrical heater/or alternatively a nozzle in the ejector pump apparatus provided with an electrical control unit. The invention can be combined with ejector pump function where 7 and 8 comprise an armature without changing the purpose of the invention. The invention can also be combined with an electrical circulation pump for refrigerant circulation and with another attachment of the ejector pump device without changing the purpose of the invention.

According to an alternative solution the system is provided with a timer. Upon detection of bubbles by the bubble detecting device, the size of the expansion apparatus's opening is arranged to be reduced and the bubble detection device is deactivated. After a certain time has lapsed since the bubble detection, the opening can be increased while the bubble detection function is reactivated. If the amount of gas bubbles still is too high, the expansion apparatus's opening is again reduced. The time set by the timer can also be dependent on the amount of gas bubbles detected by the bubble detecting device.

The invention makes it possible to recover supercooling heat without decreasing the condenser's condenser power.

By the invention, liquid flow can be regulated with the help of known control valve constructions such as electronic expansion valves. The liquid flow in cooling systems/heat pump systems can be controlled via an electronic expansion valve that is integrated into the ejector pump apparatus.

According to an embodiment of the invention liquid flow in cooling systems/heating systems can be controlled via an expansion apparatus with electrical control units and with a control signal from electronic bubble detecting devices, where the device is preferably attached to the liquid line between the condenser and the expansion apparatus with electrical control unit; the bubble detecting device can alternatively be attached before the condenser's refrigerant exit.

According to an embodiment of the invention liquid flow can be controlled via a control system consisting of an electronic bubble detecting device provided with equipment for generating a control signal to the expansion valve with electrical control unit that is intended for ejector pump function and flow control.

The invention can provide evaporation surfaces with refrigerant without needing to overheat the suction gas for control of the flow. The invention shall be applied to cooling and heating systems with vaporising/condensing refrigerant as the working medium. Controls for the system for flow control according to the invention can apply to all types of cooling system such as air-conditioning, heat pumps, process and apparatus cooling systems, freezing systems, that use piston compressors, screw compressors, scroll compressors, centrifugal compressors, rotation compressors or some other type of compressor and all types of refrigerants for heat exchange by vaporization/condensation.

Of course the invention is not limited to the embodiments described above and illustrated in the attached drawings. Modifications are feasible, especially concerning the different parts' nature, or by using comparable techniques, without for that reason departing from the protected area given in the patent claims.

REFERENCE SYMBOLS

1. Compressor
2. Condenser
3. Inspection glass for visual control
4. Electronic bubble detecting device
5. Liquid supercooler heat exchanger
6. Inspection glass for visual control
7. Expansion apparatus with electrical control unit
8. Ejector pump apparatus
9. Vaporiser
10. Space for liquid accumulation

The invention claimed is:

1. A cooling or heating system for controlling refrigerant flow, said cooling or heating system comprising:
at least one compressor;
a condenser in fluid communication with said compressor;
an expansion apparatus in fluid communication with said condenser;
a vaporizer in fluid communication with said expansion apparatus and said compressor; and
an electronic bubble detecting device for detecting any occurrence of refrigerant gas bubbles, said bubble detecting device being in fluid communication with an outlet of said condenser and before said expansion apparatus;
wherein said electronic bubble detecting device upon detection of bubbles in a flow of refrigerant condensation liquid, is adapted to generate a signal to said expansion apparatus to shut off or reduce the refrigerant flow so that a sufficient opening of said expansion apparatus is obtained so that little or no gas bubbles exist when the refrigerant condensate arrives at said expansion apparatus.

2. The cooling or heating system according to claim 1, wherein said electronic bubble detecting device is adapted to, in the absence of bubbles in the refrigerant condensation liquid, generate a signal to said expansion apparatus to open or increase the refrigerant flow.

3. The cooling or heating system according to claim 2, wherein said expansion apparatus is provided with an electric control unit, and wherein said electronic bubble detecting device is adapted to detect bubbles and to produce an electrical signal to said electric control unit of said expansion apparatus in order to effectively maneuver a degree of opening of said expansion apparatus for flowthrough of the refrigerant.

4. The cooling or heating system according to claim 3, wherein said electric control unit of said expansion apparatus is connectable to an electrical circuit for its electricity supply and for receiving signals from said electronic bubble detecting device.

5. The cooling or heating system according to claim 4, wherein said electronic bubble detecting device is connectable to said electrical circuit for its electricity supply and for production of the required signal to said electric control unit of said expansion apparatus.

6. The cooling or heating system according to claim 5, wherein said electronic bubble detecting device is provided with means that allows configuration for control of signals to said electric control unit of said expansion apparatus.

7. The cooling or heating system according to claim 5, wherein said expansion apparatus further comprising a flow control apparatus connectable to an ejector pump.

8. The cooling or heating system according to claim 1 further comprising a timer means arranged to set a time during which the size of the opening of said expansion apparatus is arranged to be reduced upon gas bubble detection.

9. The cooling or heating system according to claim 1, wherein said bubble detecting device is in fluid communication with an outlet of a heat exchanger and before said expansion apparatus, said heat exchanger being in fluid communication with said outlet of said condenser.

10. The cooling or heating system according to claim 1 further comprising an accumulator in fluid communication with an ejector pump, said vaporizer, and said compressor.

11. The cooling or heating system according to claim 1 further comprising at least two inspection glass devices, one inspection glass being locatable and in fluid communication between said outlet of said condenser and said bubble detecting device, and the other inspection glass being locatable and in fluid communication between said bubble detecting device and said expansion apparatus.

12. A cooling or heating system for controlling refrigerant flow, said cooling or heating system comprising:
at least one compressor;
a condenser in fluid communication with said compressor;
an expansion apparatus in fluid communication with said condenser, said expansion apparatus having an electric control unit;
an ejector pump connectable to said expansion apparatus;
a vaporizer in fluid communication with said expansion apparatus and said compressor; and
an electronic bubble detecting device for detecting any occurrence of refrigerant gas bubbles, said bubble detecting device being in fluid communication with an outlet of said condenser and before said expansion apparatus;
wherein said electronic bubble detecting device upon detection of bubbles in a flow of refrigerant condensation liquid, is adapted to generate a signal to said electric control unit of said expansion apparatus to shut off or reduce the refrigerant flow so that a sufficient opening of said expansion apparatus is obtained so that little or no gas bubbles exist when the refrigerant condensate arrives at said expansion apparatus;
wherein said electronic bubble detecting device in the absence of bubbles in the refrigerant condensation liquid, is adapted to generate a signal to said electric control unit of said expansion apparatus to open or increase the refrigerant flow.

13. The cooling or heating system according to claim 12 further comprising a timer means arranged to set a time during which the size of the opening of said expansion apparatus is arranged to be reduced upon gas bubble detection.

14. The cooling or heating system according to claim 12, wherein said bubble detecting device is in fluid communication with an outlet of a heat exchanger and before said expansion apparatus, said heat exchanger being in fluid communication with said outlet of said condenser.

15. The cooling or heating system according to claim 12 further comprising an accumulator in fluid communication with an ejector pump, said vaporizer, and said compressor.

16. The cooling or heating system according to claim 12 further comprising at least two inspection glass devices, one inspection glass being locatable and in fluid communication between said outlet of said condenser and said bubble detecting device, and the other inspection glass being locatable and in fluid communication between said bubble detecting device and said expansion apparatus.

17. The cooling or heating system according to claim 12, wherein said electric control unit of said expansion apparatus is connectable to an electrical circuit for its electricity supply and for receiving signals from said electronic bubble detecting device.

18. The cooling or heating system according to claim 12, wherein said electronic bubble detecting device is connectable to said electrical circuit for its electricity supply and for production of the required signal to said electric control unit of said expansion apparatus.

19. A method for controlling the flow of a refrigerant in a cooling or heating apparatus, said method comprising the steps of:

> providing a cooling or heating system comprising: at least one compressor; a condenser in fluid communication with said compressor; an expansion apparatus in fluid communication with said condenser; a vaporizer in fluid communication with said expansion apparatus and said compressor; and an electronic bubble detecting device in fluid communication with an outlet of said condenser and before said expansion apparatus;
>
> detecting any occurrence of refrigerant gas bubbles in a flow of refrigerant condensation liquid after said outlet of said condenser and before said expansion apparatus; and
>
> sending a signal, upon detection of gas bubbles, from said bubble detecting device to said expansion apparatus to shut off or reduce the refrigerant flowthrough so that a sufficient opening of said expansion apparatus is obtained so that little or no gas bubbles exist when the refrigerant condensate arrives at said expansion apparatus.

20. The method according to claim 19 further comprising the step of sending a signal, upon no detection of gas bubbles, from said bubble detecting device to said expansion apparatus to open or increase the refrigerant flow.

* * * * *